Dec. 12, 1933.  W. F. GRUPE  1,938,903
CARDING MECHANISM FOR CIGARETTE MAKING AND KINDRED MACHINES
Original Filed April 17, 1922  7 Sheets-Sheet 1
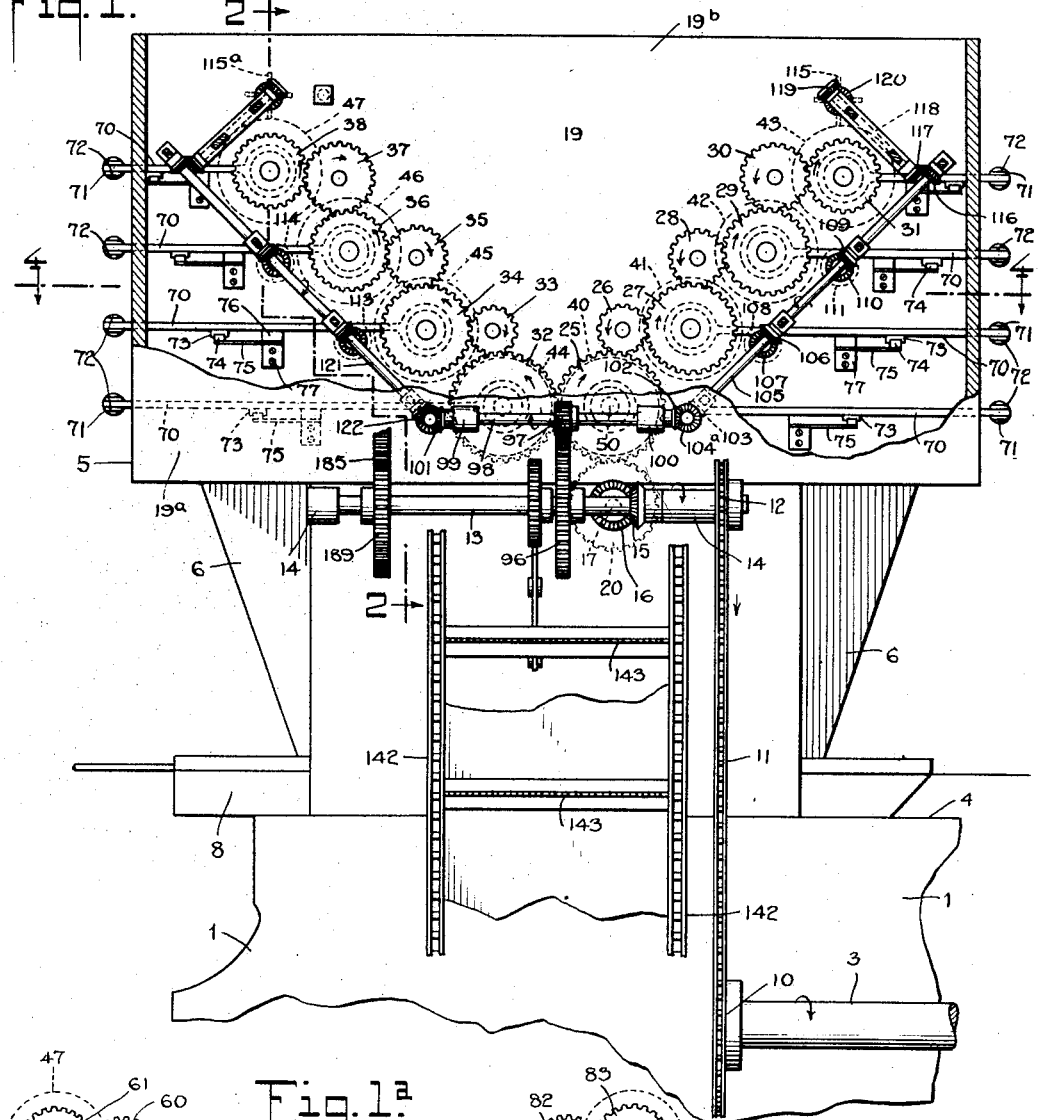
Fig. 1.
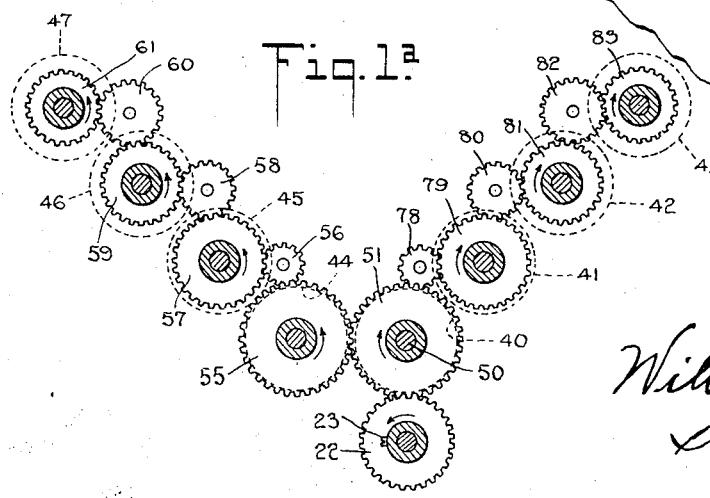
Fig. 1ª.
William F. Grupe, INVENTOR
BY Henry J. Luske, ATTORNEY Dec. 12, 1933.  W. F. GRUPE  1,938,903
CARDING MECHANISM FOR CIGARETTE MAKING AND KINDRED MACHINES
Original Filed April 17, 1922  7 Sheets-Sheet 2
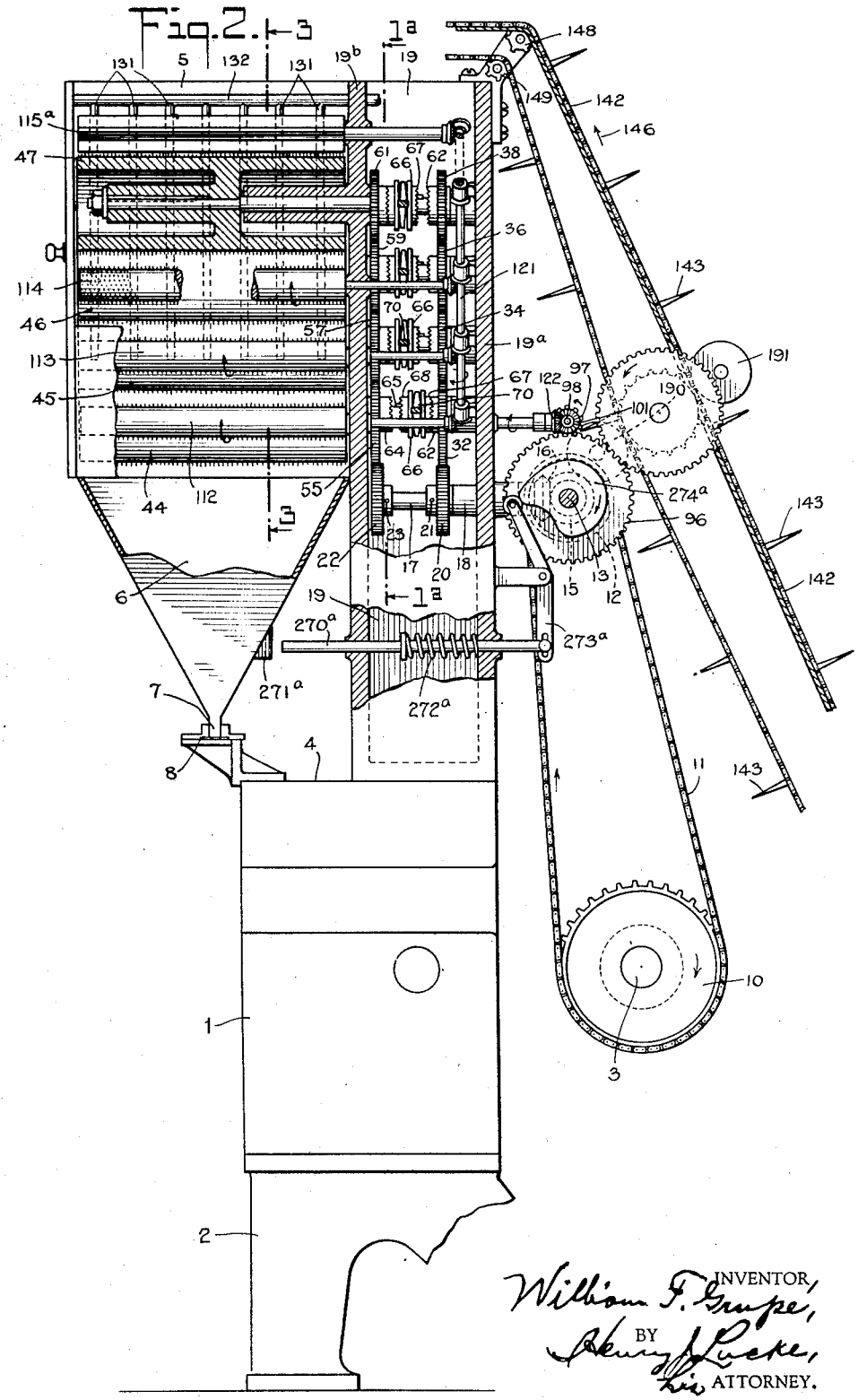

Dec. 12, 1933.                W. F. GRUPE                1,938,903
CARDING MECHANISM FOR CIGARETTE MAKING AND KINDRED MACHINES
Original Filed April 17, 1922        7 Sheets-Sheet 3
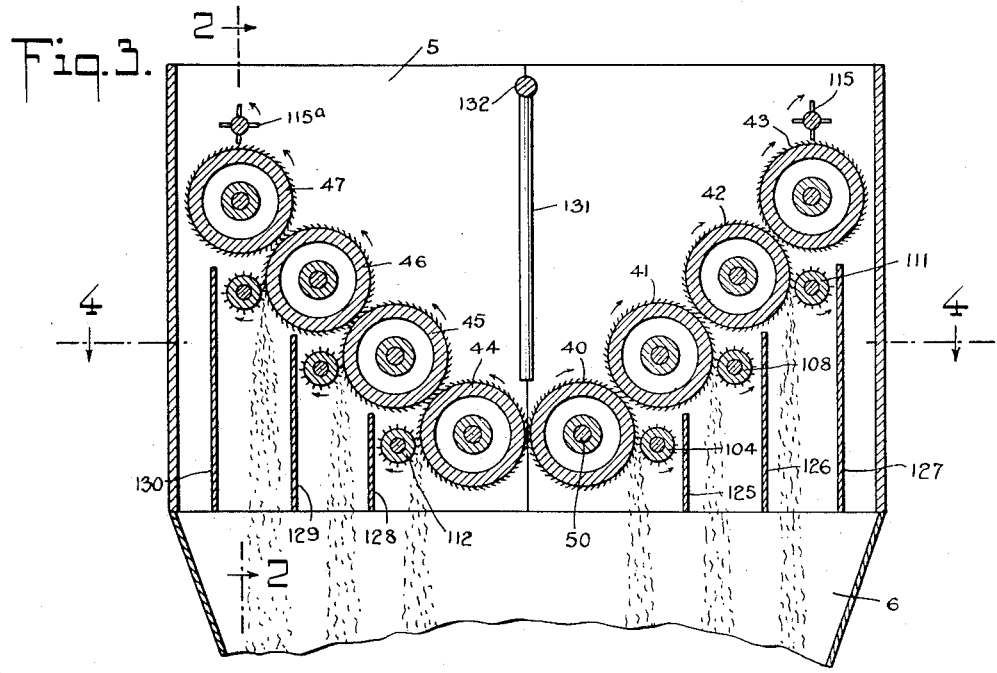
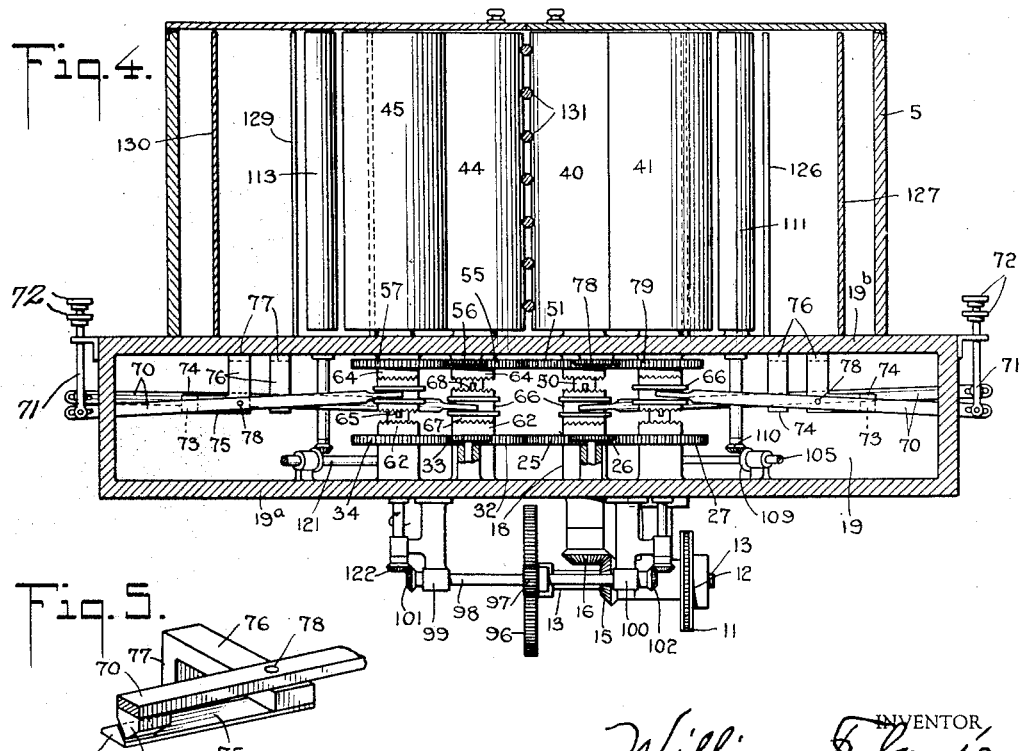

Dec. 12, 1933.          W. F. GRUPE                1,938,903
           CARDING MECHANISM FOR CIGARETTE MAKING AND KINDRED MACHINES
                 Original Filed April 17, 1922      7 Sheets-Sheet 4
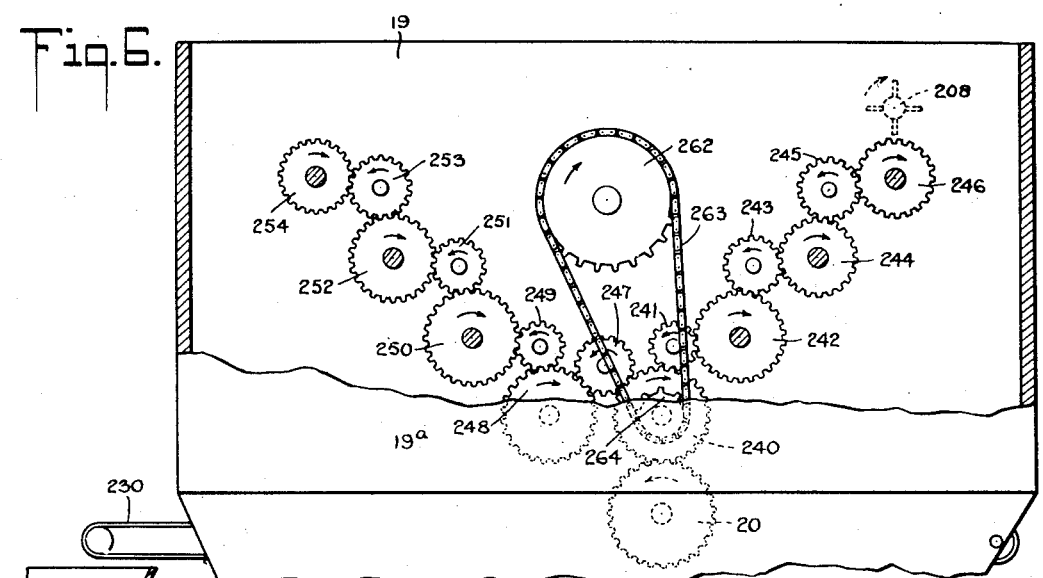
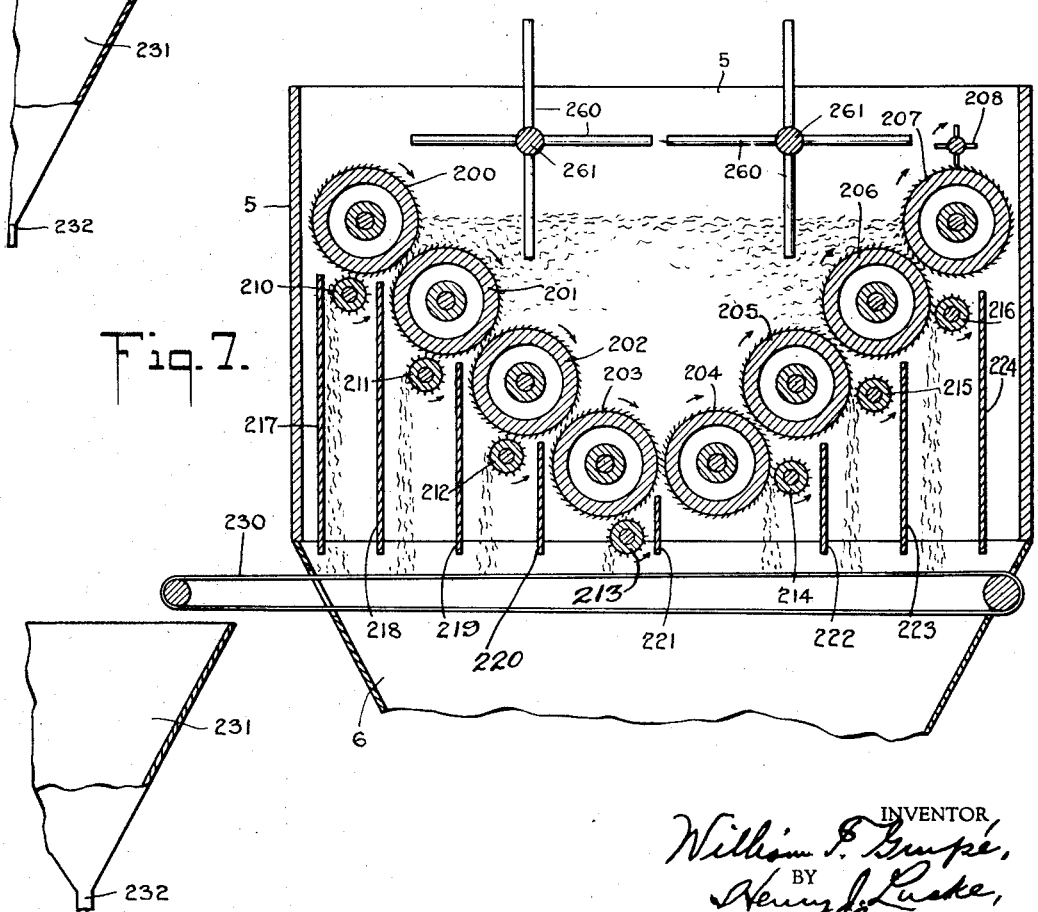
INVENTOR
William F. Grupe,
BY
Henry J. Luake,
ATTORNEY.

Dec. 12, 1933.    W. F. GRUPE    1,938,903
CARDING MECHANISM FOR CIGARETTE MAKING AND KINDRED MACHINES
Original Filed April 17, 1922    7 Sheets-Sheet 5
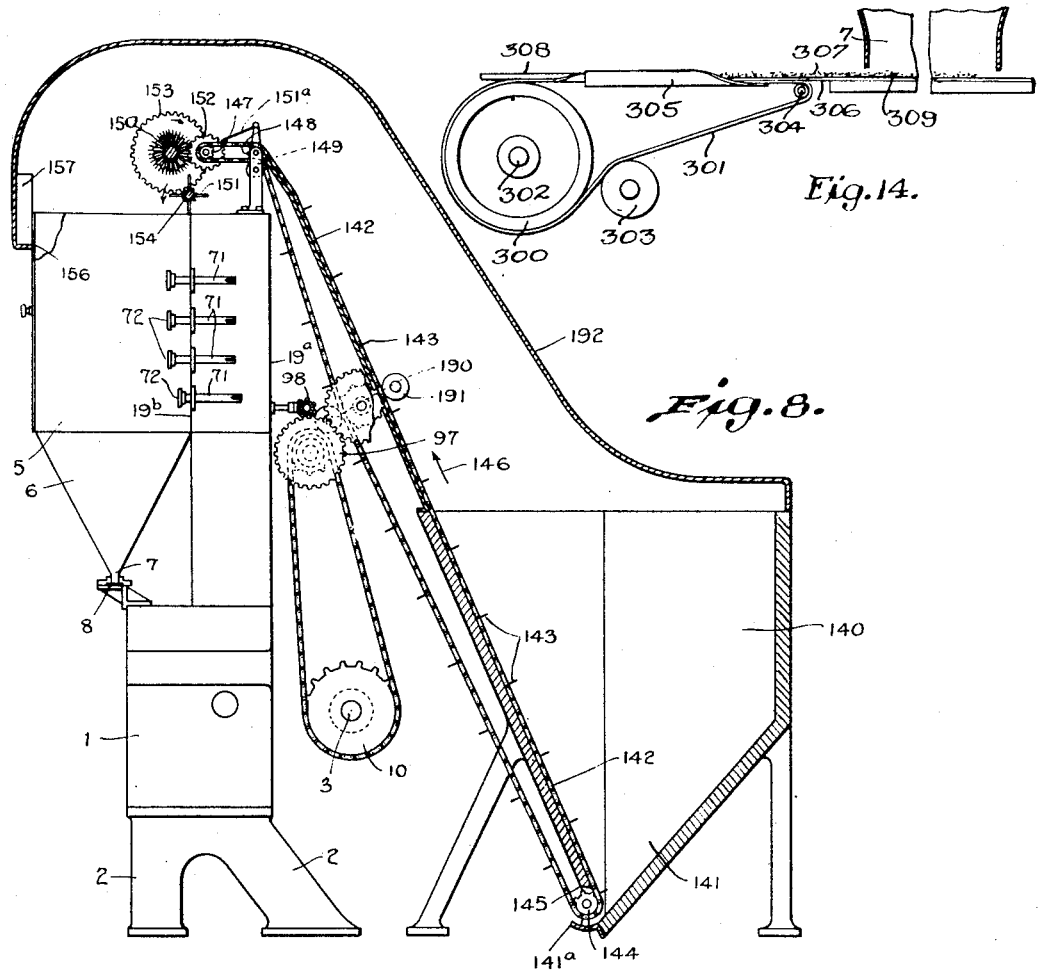
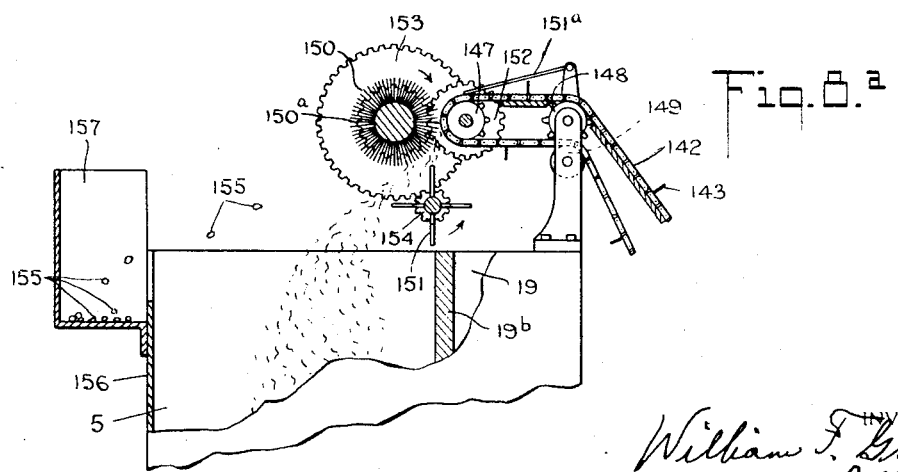

Dec. 12, 1933.   W. F. GRUPE   1,938,903
CARDING MECHANISM FOR CIGARETTE MAKING AND KINDRED MACHINES
Original Filed April 17, 1922   7 Sheets-Sheet 6
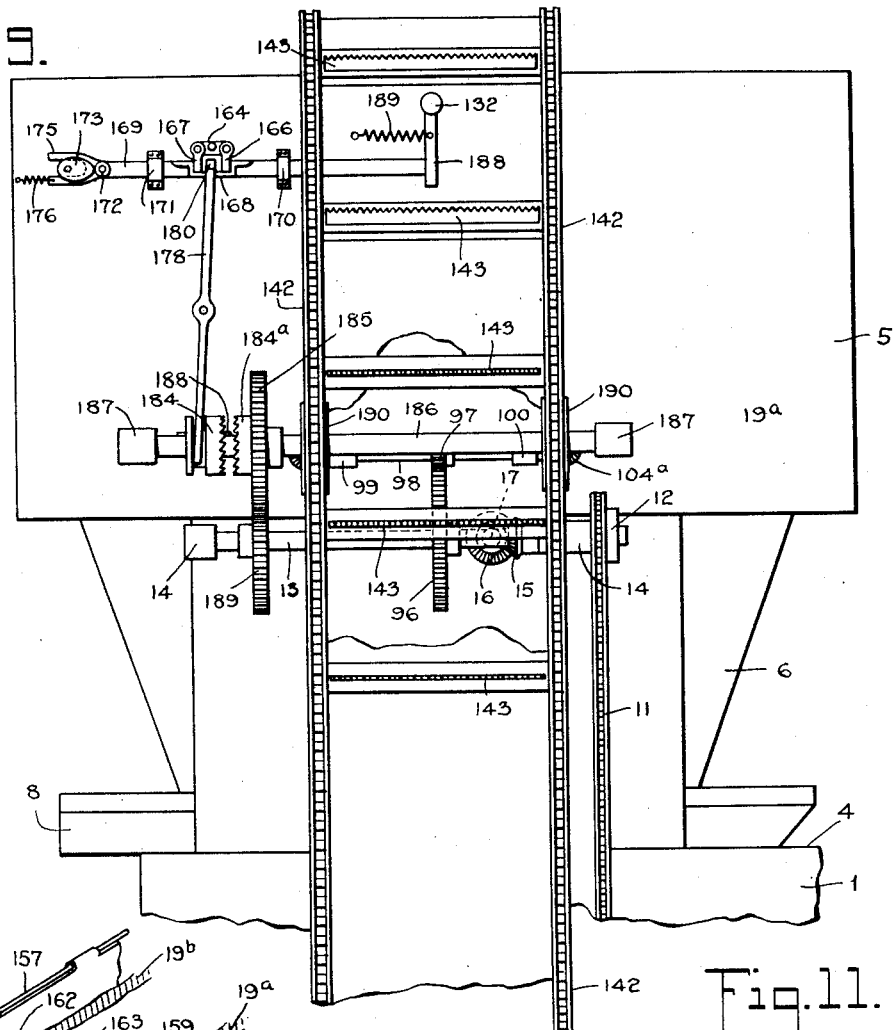
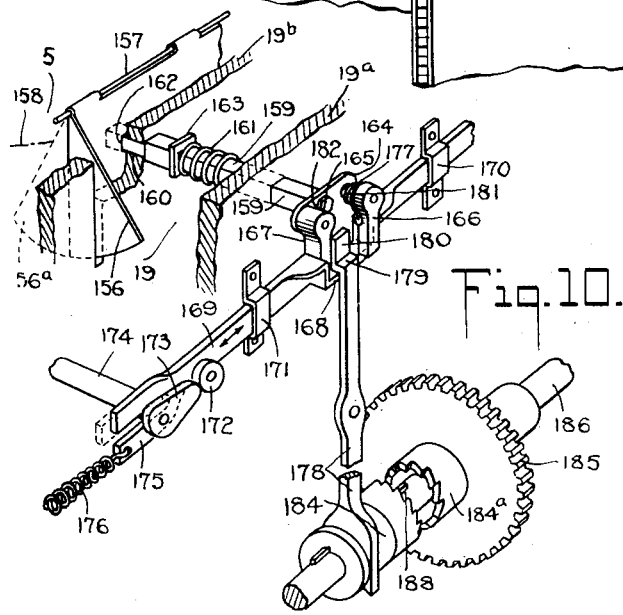
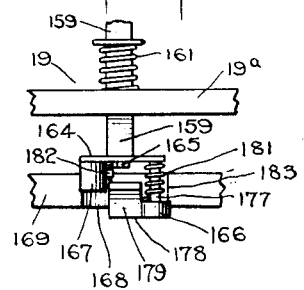

Dec. 12, 1933. W. F. GRUPE 1,938,903
CARDING MECHANISM FOR CIGARETTE MAKING AND KINDRED MACHINES
Original Filed April 17, 1922 7 Sheets-Sheet 7
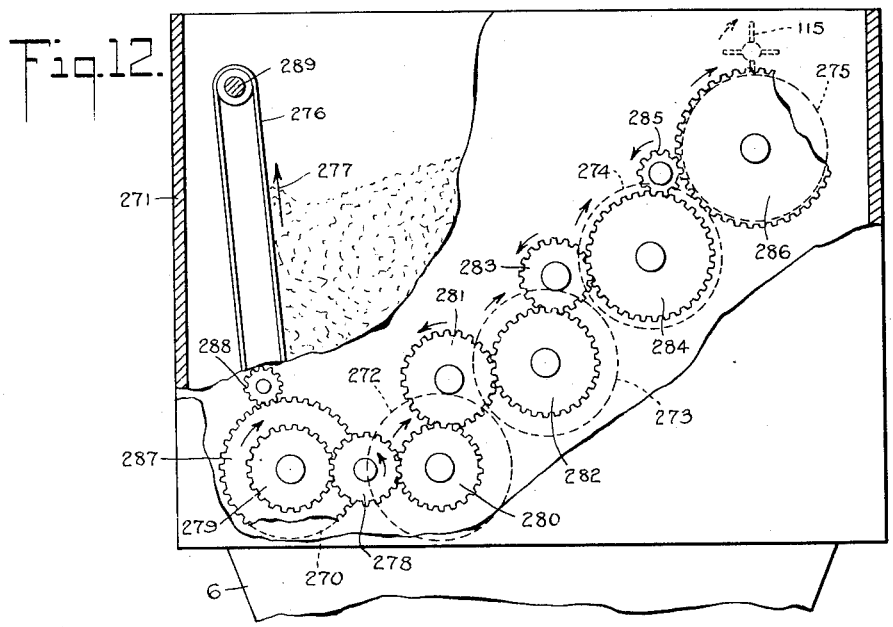
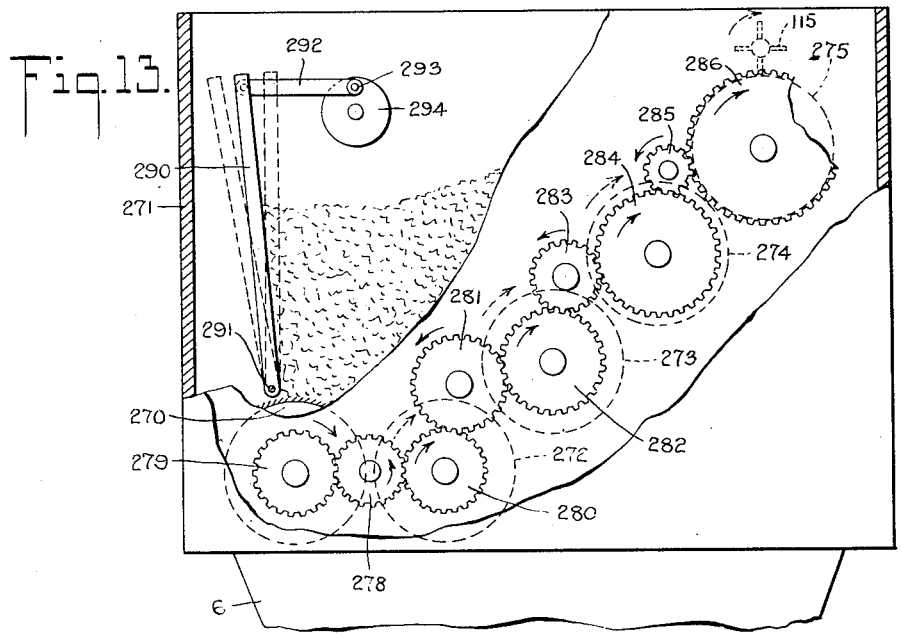
INVENTOR
William F. Grupe,
BY
Henry J. Locke,
ATTORNEY.

Patented Dec. 12, 1933

1,938,903

UNITED STATES PATENT OFFICE 1,938,903

CARDING MECHANISM FOR CIGARETTE MAKING AND KINDRED MACHINES

William F. Grupe, Lyndhurst, N. J., assignor to Ebco Machine Corporation, New York, N. Y., a corporation of New York Original application April 17, 1922, Serial No. 554,230. Divided and this application December 10, 1927, Serial No. 239,057. Renewed November 19, 1931

6 Claims. (Cl. 131—39)

This invention relates to improved carding mechanisms for cigarette making and kindred machines.

This application is a divisional application of my co-pending application Ser. No. 554,230, filed April 17, 1922, entitled Hoppers.

In cigarette making machines as heretofore proposed, particularly those in present use, the hopper carding mechanism is driven by a drive mechanism connecting the main shaft of the cigarette machine with the shafts of the carding rolls and includes one or more friction belts or other non-positive power transmitting elements. In the more frequently used types of present day cigarette machines, the power transmitting means between the main shaft of the cigarette machine and the carding rolls includes a variable speed control device, usually one or more sets of cone pulleys actuatingly connected together by means of a cross belt, or an expanding pulley and a compensating belt device. Upon feeding tobacco into the hopper, the carding operation of the tobacco charge encounters varying factors which are beyond the control of the operator and which give rise to variance between the amount of tobacco delivered by the carding rolls to the cigarette paper. Such factors include the condition of the particular portion of the tobacco at any instant which is being carded by the carding roll, as when the tobacco particles or shreds are well separated from one another, such portion of the tobacco passes with relatively less resistance through the carding roll and gives rise to relatively low feed to the cigarette machine whereas when the tobacco being carded is in knotted or dense condition, the resistance to the carding action of the carding rolls is relatively high and relatively high feed of tobacco is effected by the stripping roll. Such variable resistance gives rise to back tension on the train of driving elements and consequent slipping of the belt or belts or like non-positively geared elements which is haphazard in extent and dependent among other things upon the degree of density of the tobacco, the period of carding on such dense portion, the tightness of adjustment of the individual belts or the like, the age of the belt and wear of the pulleys.

Further incontrollable variation of delivery of the carded tobacco to the cigarette paper or to the rod-forming mechanism arises generally by reason of the mounting of the usual canvas apron on friction driving rolls, usually on a single idle roller of approximately one-half inch in diameter and located at the delivery end of the hopper, the other roll of the canvas apron being but a few inches, whereby under varying atmospheric conditions and varying extent of use, the canvas apron slips relatively to its driving roller, and thus introduces further variance between the carded tobacco delivered by the hopper and the extent of cigarette paper to which the carded tobacco is delivered.

As a result, the operator endeavors to negative the above mentioned and other defects of present day cigarette machines by adjusting the drive of the carding roll and the delivery apron of the hopper at a speed greatly in excess for the delivery of tobacco desired to avoid forming light cigarettes and accordingly increasing the weight of tobacco per average cigarette, the material cost of manufacture and also resulting in a high proportion of defective over-tight or hard cigarettes.

An object of the invention is to provide an improved form of hopper and actuating mechanism of the hopper whereby the tobacco charged into the hopper is fed from the hopper to the cigarette making machine proper in accurate amount in correspondence to the feed of the cigarette paper.

A further feature of the invention is to provide an improved form of hopper and its mechanism whereby the delivery from the hopper to the cigarette forming mechanism is subject to adjustment under the control of the operator, while continuing the operation of the machine.

With the aforesaid objects in view, a preferred form of my invention comprises a hopper of suitable internal construction and carding rolls driven from the main shaft of the cigarette machine proper by a mechanism wherein each driving element is positively actuated, and the actuation from the main shaft of the cigarette machine to the carding rolls, and preferably, also any appurtenant devices, is throughout positively transmitted from stage to stage of actuation.

I prefer to employ with my invention my improved means for automatically charging the hopper with tobacco to a determined height relative to the respective sets of carding rolls and for maintaining the charge of such height during the operation of the hopper mechanism and the cigarette making machine generally, and also positively interconnected means for positively driving the charging means and for positively operating the hopper mechanism in time relation with the cigarette machine proper and particularly the rod-forming mechanism.

Further features of the invention reside in improved driving means connecting the main shaft of the cigarette machine with the respective rolls of the hopper mechanism for attaining at the will of the operator different speeds of actuation of the rolls relatively to the speed of the main shaft of the cigarette making machine and particularly relative to the speed of actuation of the rod-forming mechanism.

A feature of my improved hopper is the alignment of the carding roll to constitute effectively the entire bottom of the hopper and thereby eliminating any "dead" regions within the hopper. A further feature of my invention is that the feed of the tobacco within the hopper to the carding rolls is by gravity whereby any tobacco "shorts", or tobacco dust, or ends of tobacco caused by the breakage due to the rotation of the rolls, are directly fed and without accumulation to the carding rolls. In contra-distinction to my invention, the carding mechanism of prior art types of carding mechanism requires the tobacco to be raised by the filleting or pins of the carding roll and accordingly giving rise to "dead" regions within which the tobacco dust, tobacco "shorts" and the like accumulate or escape through the hopper without being properly carded and fed by the carding roll.

A further feature of my invention is the provision of multiple streams of carded tobacco, preferably, with means for directing the respective streams to the delivery of the hopper to thereby maintain a uniform feeding of carded tobacco and uniform delivery of the same to the cigarette paper notwithstanding varying conditions of the tobacco charge in the hopper.

Further features and objects of the invention will be more fully understood from the following description and the accompanying drawings, in which Fig. 1 is an end elevation of a cigarette making machine provided with a hopper and carding mechanism embodying my invention, the hopper being broken away on the line 1—1 of Fig. 2 to show certain driving parts of the carding mechanism;

Fig. 1a is a detail end elevation on line 1a—1a of Fig. 2 showing the two inner trains of gearing elements for carding mechanism;

Fig. 2 is a side elevation of the hopper and its actuating mechanism, shown in Fig. 1, and broken away on line 2—2 of Fig. 1;

Fig. 3 is a sectional elevation on line 3—3 of Fig. 2, and showing also a preferred form of device arranged within the hopper and preventing the matting together of the tobacco into balls or the like; and breaking down bridges causing air holes;

Fig. 4 is a sectional elevation on line 4—4 of Fig. 1;

Fig. 5 is a detail perspective view of the stop element of each push rod for controlling the clutches of the variable carding roll drive;

Fig. 6 is a side elevation, partly broken away, showing a modified form of gearing arrangement and carding operation and also a modified form of distributor within the hopper;

Fig. 7 is a central vertical sectional view of the construction shown in Fig. 6 with the modification of the use of two distributors in lieu of one in Fig. 6;

Fig. 8 is a side elevation of a cigarette making machine embodying my invention as aforesaid, showing particularly the automatic means for charging the hopper;

Fig. 8a is a detail side elevation on an enlarged scale of the delivery end of the conveyer and cleaning mechanism thereat, indicated in Fig. 8;

Fig. 9 is a detail end elevation on an enlarged scale of the conveyer shown in Fig. 8 and showing also additional elements of the control and actuating mechanism of the automatic charging conveyer;

Fig. 10 is a detail perspective view of the control device of the automatic charging conveyer;

Fig. 11 is a detail top plan view of a portion of the control means of starting and stopping the automatic charging means;

Fig. 12 is a detail side elevation of a hopper, partly broken away, provided with a modified form of carding mechanism;

Fig. 13 is a detail side elevation of a hopper, partly broken away, and provided with a further modified form of carding mechanism; and Fig. 14 is a diagrammatic side elevation showing my hopper assembled with the usual paper feed and rod-forming devices.

As an example of one preferred form of my invention, I have illustrated in the accompanying drawings, embodiments as applied to a commonly employed type of cigarette making machine.

Referring to Figs. 1 and 2, the bed of the cigarette machine is indicated at 1 having the usual feet 2. The drive shaft of the cigarette machine is shown at 3. The top plate of the cigarette machine is shown at 4, on which is located the cam drive of the cut-off mechanism, the brackets for supporting the rod-forming mechanism and other usual operating parts, as will be understood by those skilled in the art.

The hopper embodying my invention is indicated generally at 5 and is preferably equipped with the contracting discharge 6, culminating in the rectilinear, narrow slot 7 communicating directly with the chute 8 directly above the cigarette paper fed in the usual manner from a suitable reel through and at the bottom of the chute 8 to the rod-forming mechanism proper of the cigarette making machine.

To the drive shaft 3, driven say in the direction of the indicating arrow, is fixed the sprocket gear 10, see Figs. 1 and 2, connected positively by the chain 11 with the sprocket gear 12, fixedly mounted on the shaft 13, which serves as the main drive shaft of the hopper mechanism. By selecting the proper sizes of the sprocket gears 10 and 12, the operator regulates grossly the delivery of carded tobacco required for any particular size of cigarette. Variations in the delivery of carded tobacco due to variations in the particular condition, grade or character of the tobacco are compensated for by my carding mechanism and appurtenant devices, as is set forth more fully hereinafter.

Pursuant to my invention, I provide a plurality of carding rolls arranged in upwardly extending sets, one set as viewed in Fig. 3 extending to the right and another set extending to the left, the carding rolls as an entirety forming the bottom and two sides of the hopper, and variable speed drive for the respective carding rolls comprising two trains of gearing, referred to generally as an outer train and an inner train, for each of the right-hand and left-hand sets of carding rolls and a clutch for coupling the individual carding rolls either with the inner train or with the outer train of gearing.

To provide for such arrangement, the shaft, 13, is mounted in the spaced bearings 14, 14, and to the shaft 13 is secured the bevel gear 15 meshing with the bevel gear 16, see Figs. 1 and 2. The bevel gear 16 is secured to the shaft 17 extending through the bearing 18 from the exterior of the hopper 5 through the compartment 19 of the hopper in which are located the gearing and clutches for variable drive of the carding rolls and appurtenant elements, as will be particularly pointed hereinafter. The spur gear 20 is suitably connected to the shaft 17 by a set screw 21 or the like. The shaft 17 extends through the outer wall 19a of the compartment 19 and through the inner wall 19b, in both of which it is journalled in any suitable bearings. The spur gear 22 is secured to the shaft 17 by the set screw 23 or the like.

As appears in Fig. 1, the outer train of main and interconnecting gears is arranged in continuous and positive mesh with the gear 25, for the right-hand set of carding rolls namely, the interconnecting gear 26, the main gear 27, then the interconnecting gear 28, then the main gear 29, then the interconnecting gear 30, then the main gear 31, etc.

It will be noted that the main gear 27 is provided with a lesser number, say three, of teeth of the same size than the main gear 25 and the main gear 29 similarly with three less teeth of the same size than the main gear 27 and the main gear 31 similarly has three less teeth of the same size than the main gear 29; the interconnecting gears 26, 28 and 30 have teeth of the same size as the main gears and are of proper diameters to maintain positive mesh from one main gear to the next main gear.

In similar positive gearing, and similar gear ratio relation, I have arranged, see Fig. 1, an outer train of main and interconnecting gears for the left-hand set of carding rolls, namely the main gear 32 meshing with the interconnecting gear 33, in turn meshing with the main gear 34, connected by intermediate gear 35 with the main gear 36, in turn interconnected by the gear 37 with the main gear 38, such train of gears extending upwardly in a direction corresponding to the number and locations of their carding rolls disposed within the hopper 5, as is indicated in Fig. 3. In the last named train of gearing, the main gear 32 of the outer left-hand train meshes directly and has the same number of teeth of the same size as the main gear 25, of the outer right-hand train. The main gear 34 has a less number of teeth say three, than the main gear 32, whereas the main gear 36 has three less teeth than the main gear 34, and the main gear 38 has three less teeth than the main gear 36.

The main gears 32, 34, 36 and 38 of the outer left-hand train may be duplicates respectively of the aforesaid main gears 25, 27, 29 and 31 of the outer right-hand train.

As appears in Fig. 3, the right-hand set of carding rolls are indicated 40, 41 and 42, and their uppermost dressing roll 43, and the left-hand set of carding rolls are indicated 44, 45 and 46, and their dressing roll 47. As is also indicated in Fig. 3, the rolls 40, 41, 42 and 43 are each driven in the same rotative direction, to wit, in clockwise direction, and the rolls 44, 45, 46 and 47 are rotated commonly in the opposite direction, to wit, in counterclockwise direction.

The rolls 40, 41, 42, 43, 44, 45, 46 and 47 are connected respectively with their driving gears in a common manner and accordingly a detail description of the drive and connections of the lowermost right-hand carding roll 40 will suffice to specifically describe the drive and connections of all the carding rolls.

As is indicated in Fig. 4, the carding roll 40 is provided with the stud shaft 50, mounted in a suitable bearing in the inner wall 19b of the compartment 19 of the hopper 5, and extends across the compartment 19 to a suitable bearing in the outer wall 19a of the compartment 19. Its main gear 25 of the aforesaid outer right-hand train of main gears is loosely mounted on the shaft 50 adjacent the outer wall 19a of the compartment 19.

As has been stated generally hereinabove, for each set of carding rolls there is provided another or so-called inner train of main and interconnecting gears, arranged in side by side correspondence with the aforesaid outer train respectively and the respective main gears of such outer set rotates at a different speed than the corresponding main gear of the aforesaid inner set. A clutch is provided for each carding roll for alternately connecting such roll either with its main gear of the outer train or with its main gear of the inner train. The clutch is operated by the operator for varying at will the rotation and carding operation of the particular carding rolls.

The inner left-hand train of gears, see Figs. 1a and 2, is driven from the aforesaid gear 22 through the main gear 51, of the right-hand inner train of gears and comprises the main gear 55, the intermediate gear 56 meshing with the main gear 57, in turn meshing with the intermediate gear 58, connecting with the main gear 59, connected by the intermediate gear 60 with the main gear 61. The main gear 57 has a lesser number of teeth of the same size and different from three, say two, than the main gear 55; similarly, the main gear 59 has two less teeth of the same size than the main gear 57 and the main gear 61 has two less teeth of the same size than the main gear 59.

As appears in Fig. 2, the main gear 32 of the outer left-hand train of gears for the lowermost left-hand carding roll 44 is provided on the inner face with the set of clutch teeth 62 and the main gear 55 of the inner left-hand train of gears for the left-hand carding roll 44 is provided with a set of clutch teeth 64. The clutch collar 66 is keyed by the spline 65 to the shaft of the carding roll 44 and the collar 66 has a right-hand set of clutch teeth 67 and a left-hand set of clutch teeth 68, for meshing respectively either with the clutch teeth 62 of the main gear 32 or with the clutch teeth 64 of the main gear 55.

As appears in Fig. 4, the clutch collar 66 of the carding roll 44 is shifted by means of its lever 70, having the link 71, at the end of which is the knob 72 to afford convenient operation exteriorly of the hopper 5. As is shown in Figs. 2 and 4, the clutch collar 66 has its teeth 67 in engagement with the clutch teeth 62 of the main gear 32 of the outer left-hand gear train.

For the purpose of insuring the collar 66 to be either in mesh with the main gear 32 of the outer left-hand gear train or with the main gear 55 of the inner left-hand gear train, and also for the purpose of giving instantaneous change of uncoupling from one main gear to coupling with the other main gear, I equip the shift lever 70 with the detent 73, see Fig. 5 in enlarged view and also Figs. 4 and 1, which detent 73 is provided with angular faces meeting at an edge located to one side of the center of the throw of the shift lever 70, and which detent 73 coacts with the lug 74 having similar angular faces meeting at an edge. The lug 74 is mounted on the spring strip 75 suspended from the bracket 76 secured at its end 77 to the inner wall 19b of the compartment 19. The clearance between the clutch faces and the gear faces is so slight that practically the moment that the clutch collar is uncoupled with one gear it is coupled with its other gear and thereby the continued rotation of the carding roll is insured during the stage of changing its speed.

In practice, I arrange the clutch collar to be constantly engaged during the period of transfer from one gear to the opposite gear, that is to say, there is no clearance between the collar and the opposite gears when being shifted. This arrangement is made possible by reason of the relatively small difference in speed betwen the gears during the stage of actual shifting from one gear to the other and the clearance between the teeth of the clutch faces.

The shift lever 70 may be conveniently pivoted at 78 to the bracket 76.

Thus, upon the operator grasping the knob 72, to push inwardly or pull outwardly the link 71, the clutch collar 66 will be snapped from connection with the outer main gear 32 to connection with the inner main gear 55, or vice versa; in a similar manner, the clutches for each of the remaining carding rolls of the left-hand set and those of the right-hand set are operated for instantaneous shifting of alternate gearing relation with either its main gear of the respective inner and outer gear trains.

The inner train of gearing elements for the right-hand set of gearing rolls is shown in Fig. 1a and comprises the main gear 51 connected by the intermediate gear 78 with the main gear 79, in turn connected by the intermediate gear 80 with the main gear 81. The main gear 81 is connected by the intermediate gear 82 with the gear 83 for operating the dressing roll 43. The main gear 79 is of lesser number of teeth of the same size than the main gear 51; and the main gear 81 is of lesser number of teeth of the same size as the main gear 79, similar to the variation of gearing ratios of the inner left-hand train of gearing elements 55, 57 and 59, as aforesaid.

By means of the above alternate outer and inner trains of gearing for the carding rolls 40, 41 and 42, upon coupling the clutch of any roll with its main gear of the outer set, such roll is operated at a relatively higher speed, whereas any roll when coupled by its individual coupling with a main gear of the inner train of gears is operated at relatively lower speed. Similarly, in respect to the left-hand set of carding rolls 44, 45, 46, 47, upon coupling any roll with its main gear of the outer train of gears is operated at relatively higher speed and upon coupling any roll with its main gear of the inner train of gears is operated at relatively lower speed.

It will be understood that the particular speeds of the main gears of the outer and inner trains of gearing may be selected as desired.

The stripping rolls of the aforesaid respective carding rolls are operated at any desired uniform speed and by positively actuated gearing elements. As an example of a driving mechanism for the stripping rolls, the gear 96, see Fig. 1, is secured to the shaft 13 driven by the sprocket chain 11 and sprocket wheel 12, as aforesaid. The gear 96 meshes with the gear 97 keyed on the shaft 98, mounted in the spaced bearings 99, 100 and driving at its opposite ends the mitre gears 101, and 102, secured thereto. The mitre gear 102 meshes with the mitre gear 104a, secured to the shaft of the lowermost right-hand stripping roll 104, see Fig. 3 cooperating with the carding roll 40 and rotating in direction counter to the direction of rotation of the carding roll 40. The mitre gear 104a meshes with the mitre gear 103 secured to the upwardly extending counter-shaft 105. On the counter-shaft 105 is secured the mitre gear 106, meshing with the mitre gear 107 secured to the shaft of the stripping roll 108, see Fig. 1, coacting with and rotating opposite to the direction of rotation of the carding roll 41. Similarly, the mitre gear 109, secured to the shaft 105, meshes with the mitre gear 110 on the shaft of the stripping roll 111 of the carding roll 42.

As appears in Fig. 1, the counter-shaft 105 is utilized to drive the brush 115 of the uppermost, right-hand dressing roll 43, as by means of the mitre gear 116, secured to the counter-shaft 105, and meshing with the mitre gear 117, secured at one end to the short shaft 118 having at its other end the mitre gear 119 meshing with the mitre gear 120 fixed to the shaft of the brush 115.

The stripping rolls 112, 113 and 114 of the left-hand set of carding rolls 44, 45 and 46, respectively are geared positively to the left-hand counter-shaft 121 in a similar manner; the counter-shaft 121 is driven by its mitre gear 122, meshing with the mitre gear 101, on the shaft 98. The direction of rotation of the stripping rolls 112, 113 and 114 is opposite to that of the respective carding rolls 44, 45, 46 with which they respectively coact. The uppermost dressing roll 47 is provided with the brush 115a, operating and driven similarly as the brush 115, but in the opposite direction as indicated.

In the construction shown in Figs. 1 and 3, the right-hand set of carding rolls 40, 41, 42, 43 are rotated in clockwise direction whereas the left-hand set of carding rolls 44, 45, 46, 47 are rotated in counter-clockwise direction.

The uppermost right-hand roll 43 and the uppermost left-hand roll 47 are dressing rolls and in the carding operating of the carding rolls, the speed of the dressing rolls need not be varied when varying the speed of the carding rolls of their respective sets; however, I have shown main gears embodied in the respective inner and outer trains of the serially connected gearing elements respectively for the dressing roll 43 of the right-hand set and the dressing roll 47 of the left-hand set whereby the speeds of the dressing rolls 43, 47 may be varied if desired.

Upon charging the hopper with tobacco, and preferably by an automatic charging means such as is set forth more fully hereinafter, the tobacco is brought in contact with the filleting or carding pins secured to and inclined obliquely to the periphery of the respective rolls in the direction of rotation, whereupon the shreds or comminutions of tobacco are caught in such filleting or pins and carded by mutual coaction between pairs of adjacent carding rolls and stripped by the respective stripping rolls.

For the purpose of attaining uniformity of distribution of the carded tobacco, I arrange between such carding roll and the delivery of the hopper of partition for directing the tobacco carded by such carding roll and its cooperating stripping roll in definite relation to the total discharge of tobacco from the hopper. Thus, as is indicated in Fig. 3, the partition 125 is arranged closely adjacent the stripping roll 104 to direct the tobacco carded by the carding roll 40 and its stripping roll 104 definitely toward the delivery outlet 6 of the hopper. The partition 126 in a similar manner limits the direction of travel of the tobacco carded by the carding roll 41 in coaction with its stripping roll 108 toward the delivery outlet of the hopper. The partition 127 in a similar manner directs the distribution of the tobacco carded by the carding roll 42 and its stripping roll 111 toward the delivery outlet of the hopper.

In a similar manner, the partitions 128, 129 and 130 are arranged to direct the respective streams of carded tobacco from the left-hand carding rolls 44, 45, 46, respectively toward the delivery outlet 6 of the hopper 5.

As shown in Fig. 1, the set of right-hand carding rolls 40, 41, 42 and the left-hand set of carding rolls 44, 45, 46 are indicated in outline by dash lines. By reason of the respective clockwise and counterclockwise rotations of the right-hand and left-hand set of carding rolls respectively the tobacco is continuously agitated; the portion of the charge adjacent the right-hand set of carding rolls is subjected to agitating forces directed generally parallel to the plane common to the axes of the shafts of the right-hand rolls whereas the portion of the tobacco charge adjacent the left-hand set of carding rolls is subjected to agitating forces directed generally parallel to the plane common to the axes of the shafts of the left-hand rolls, whereby in the event of any heaping of the tobacco charge vertically in the central region of the hopper, such portions of the tobacco will fall, and are brought into engagement with the respective lowermost carding rolls 40, 44 and again subjected to the divergent forces of agitation, respectively extending upwardly towards the right and left, and the agitation repeated or continued.

Usually such agitation prevents any "bridging" and "air pockets" action of the tobacco but in the event of any such action taking place, as with certain grades of tobacco, I provide, as is indicated in Fig. 3, the distributor comprising a set of fingers 131 secured to and suspended from the common rod 132, the shaft of which extending through the walls 19b, and is provided with a gear secured thereto and operated by a suitable cam driven from the main shaft 3 by any suitable gearing arrangement, as will be understood by those skilled in the art. The fingers 131 are thereby oscillated within the central region of the hopper 5 above the centrally located, lowermost carding rolls 40, 44. Under the condition of felting of the tobacco shreds within the interior of the hopper, such felting action will be limited by the fingers 131 striking the felted mass to break up and distribute the same within the portions of the charge subjected directly to agitation by the right-hand and left-hand sets of carding rolls as aforesaid.

As indicated hereinabove, the tobacco is preferably charged into the hopper 5 by automatic means. I have shown one preferred form of automatic charging means comprising, see Fig. 8, the bin 140 having a contracting bottom 141 and having a curved extension 141a through which passes the opposite endless conveyer chains and intermediate canvas belt 142 having longitudinally spaced plates having teeth or prongs 143, extending at right angles to the direction of length of the conveyer 142. A set of sprocket gears 144 is suitably located near the bottom 141 of the bin 140 as in the recess 145 in the bottom 141, to project the sprocket gears 144 within the bottom 141 of the bin 140. The upwardly travelling lead of the conveyer 142 passes through the bin 140 in the direction of the arrow 146 and its pickers 143 gather tobacco and carry the same upwardly to a region above and toward one side of the hopper 5, at which the chain 142 passes over the set of sprocket wheels 147, suitably mounted on a bracket supported at the top of the hopper 5. The set of sprocket gears or idlers 148, 149 respectively support and guide the conveyer chain 142 at the edge of the hopper 5.

Suitably mounted on its shaft in oppositely disposed brackets, supported at the top of the hopper 5, is the pick roll 150 having substantially radially extending picker pins, and coacting with the set of spring fingers 151a for shredding or "ginning" the tobacco as it is delivered at the uppermost travel of the conveyer chain 142. The pick roll 150 is rotated clockwise to deliver the "ginned" tobacco to the winnower 151 whose shaft is suitably journaled in oppositely disposed bearing brackets (not shown) carried by the hopper 5.

The picker 150 and the winnower may be rotated by the conveyer as by securing a gear 152 (see Fig. 8a) to the shaft of the set of sprocket wheels 147, and meshing with the gear 150a, secured to the shaft of the picker 150; the gear 153 meshes with the smaller gear 154 secured to the shaft of the winnower 151, to rotate the winnower 151 at a relatively high speed.

The winnower 151 is rotated in any suitable manner in counterclockwise direction and at a high speed to distribute the shredded tobacco substantially uniformly over the upper region of the hopper 5. At such speed of rotation of the winnower 151, any stems, wood, stones, nails or the like 155 will be hurled beyond the end wall 156 of the hopper 5 and therefore outside of the hopper and may be caught in any suitable receptacle 157 if desired. Also, in the event that any nail, stone and the like be present in the tobacco charged by the conveyer 142 into the winnower 151, the momentum of such relatively heavy portion 155 will cause the same to be hurled exteriorly of the hopper 5. Such elimination of heavy and foreign material in advance of the carding of the tobacco prevents damage to the carding mechanism and its filleting, prevents breaking of the cigarette paper, breakage of the tube belt, dulling and injury to the cutter knife and also improves the quality of the formed cigarettes.

The control rod 159 (Fig. 10) projects through suitable recesses in the walls 19a, 19b of the compartment 19 of the hopper 5 and coacts with a suitable control device whereby under the condition of the tobacco charge within the hopper falling below the predetermined level 158 and the plate 156 extending to or toward the direction indicated by the dotted outline 156a (showing the advanced movement of the plate 156), such control device automatically starts the actuating mechanism of the conveyer 142; and upon the tobacco extending effectively above the predetermined level 158, the plate 156 is forced by the increased weight of the tobacco from its position indicated in dotted outline at 156a toward its position 156 indicated in full outline, and thereby project the control rod 159 to the right as viewed in Fig. 10, and automatically stop the actuating mechanism of the conveyer 142.

As one such form of control device, I have illustrated in Figs. 9 and 10, and 11, the bar 164 secured centrally at the outer end 165 of the control rod 159 and provided with the depending pawls 166, 167 extending within the U-shaped portion 168 of the reciprocated rod 169.

The reciprocating rod 169 is mounted, say horizontally, in the spaced sleeves 170, 171 and provided with the cam roller 172 coacting with the cam 173 secured to the top dressing roller shaft 174 rotated in any suitable manner from the main shaft 3, or otherwise as may be preferred. The reciprocating rod 169 may be provided with the fork 175 extending about the end of the shaft 174. The retractile spring 176 serves to hold the roller 172 in contact with the cam 173, and functions to return the rod 169 on its return reciprocations.

Coacting with the aforesaid elements is the lever 178, pivoted at 178a and controlling, as more particularly described hereinafter, the clutch for coupling the actuating elements of the conveyer 142 with the power shaft 3 or any suitable drive arrangement operated by the power shaft 3, whereby under the condition of the detector rod 159 being moved to or adjacent its innermost position, the lever 178 is moved to clutch-closing position and when the detector rod 159 is moved to or adjacent its outermost position, the clutch lever 178 is moved to clutch-opening position.

The pawl 167 is mounted on the bar 164, of the detector rod 159, to be located within the U-portion 168 of the reciprocatory rod 169. The pawl 166 is mounted on an arm 177 to project the pawl 166 from the bar 164 to a greater extent than the pawl 167, as appears in Fig. 11. Coacting therewith is the clutch lever 178 of the actuating mechanism of the conveyer 142, by means of the off-set portion 179 and the upwardly extending portion 180, projecting within the U-portion 168 of the reciprocatory bar 169. When the detector bar 159 is at its outer position, the pawl 167 is located within the U-portion 168 in the position indicated in Figs. 10 and 11, and upon reciprocation of the bar 169, the pawl 167 encounters the end portion 180 of the clutch lever 178, whereby the clutch lever 178 is held in uncoupling position. In such circumstance, the pawl 166 is positioned within the U-shaped portion 168 of the reciprocatory bar 169 but in non-operative relation with the extension 180 of the clutch lever 178. When the detector plate 156 is at its inner position, the pawl 167 is moved inwardly while still within the U-shaped portion 168 but out of operative relation with the extension 180 and the pawl 166 is moved inwardly and into operative relation with the extension 180 to throw and maintain the clutch lever 178 in clutch-closing position, upon continued reciprocation of the bar 169.

The extreme left-hand position of the clutch lever 178 is shown in Fig. 10 and it will be noted that the extent of reciprocation of the bar 169 corresponds to proper displacements of the pawls 166 and 167 respectively as above noted.

The spring 181 is provided for the pawl 166 to tend to resiliently hold the pawl 166 against clockwise turning and toward the vertical position shown in Fig. 10 and the spring 182 is provided for the pawl 167 tending to resiliently hold the pawl 167 against counter-clockwise turning and toward the vertical position shown in Fig. 10.

It will be observed from Fig. 10 that the plate 156 is preferably provided with opposite side aprons as indicated which are located in slots 156b (one only being shown) in the wall 19b, to prevent the tobacco in the hopper 5 from accumulating to the rear of the plate 156 and thus interfering with the plate 156 in its return or outward movement when the charge in the hopper is increased.

Such clutch lever 178 is arranged in any suitable manner with any suitable actuating mechanism for the conveyer 142, as by providing the laterally operating clutch comprising (see Figs. 9 and 10) the clutch elements 184 and 184a, the latter secured to the gear 185. The gear 185 is loosely mounted on the shaft 186, and the shaft 186 is journalled in the spaced bearings 187, 187. The clutch element 184 is connected to the spline 188 fixed on the shaft 186. The gear 185 meshes with the driving gear 189 fixed on the shaft 13, see also Fig. 1. On the shaft 186 is also positioned the set of sprocket gears 190, see Figs. 8 and 9, meshing respectively with the right-hand and left-hand upper and lower leads of the charging conveyer chain 142. The rollers 191, see Fig. 8, are provided to guide the respective right-hand and left-hand upper leads of the chain 142 in operative relation with the driving sprocket gears 190, 190.

Accordingly, upon the clutch lever 178 being moved to uncoupling position, as is indicated in Figs. 9, 10, the gear 189 rotates the gear 185 idly but upon the clutch lever 178 being moved to coupling position, the clutch element 184 is brought into operative engagement with the clutch element 184a, whereby the shaft 186 is actuated, thereby rotating the driving sprocket gears 190, 190 of the conveyer chain 142 to actuate the conveyer 142 as hereinabove described.

From the above, it will be observed that the carding mechanism of the hopper is continuously operated and continuously feeds the tobacco from the hopper to the cigarette forming mechanism. The charge of the tobacco within the hopper is reduced in quantity, and therewith lowering the level of the tobacco charge in the hopper, below the predetermined level 158, the detector plate 156 rises under action of its spring 161 actuating the detector rod 159, thus bringing the pawl 166 into position, whereby upon reciprocation of the rod 169 to effect the shifting of the clutch lever 178 and thereby coupling the clutch member 184 with the clutch member 184a, whereupon the tobacco feeding conveyer 142 is set into actuation. The feeding of tobacco into the hopper by the conveyer 142 continues until the level of the charge of tobacco within the hopper attains substantially the predetermined level 158, at which stage the detector plate 156 is receded, as above described, causing its detector rod 159 to be pushed outwardly relatively to the hopper to bring the pawl 167 into operative relation with the lever 178 and shift the same to uncouple the clutch member 184a, and again bring the conveyer 142 to rest, whereby the mechanism for feeding the tobacco into the hopper serves to maintain the quantity of the tobacco within the hopper substantially constant and the level of the tobacco maintained substantially uniform. It will also appear that the mechanism controlled by the tobacco level in the hopper follows the variation of and is controlled by the tobacco level in the hopper.

The bin 140, the charging conveyer 142 and the top of the hopper 5 are enclosed by a removable cover 192, see Fig. 8, for the purpose of reducing the loss of moisture, or of the volatile oils or other fluids of the tobacco, and protecting the tobacco from dust or other foreign substances and like purposes.

As will be noted in Fig. 9, the shaft 132 of the oscillating, agitating arms 131 (see Fig. 3) may be operated by the reciprocatory rod 169, as by the provision of the finger 188 secured to the outer end of the shaft 132 and located in the path of reciprocation of the rod 169 to provide for the counter-clockwise throw and the retractile spring 189 to return the finger 188 and provide for the clockwise extent of oscillation of the arms 131.

In the modification shown in Figs. 6 and 7, the carding mechanism comprises the left-hand set of carding rolls and designated respectively 200, 201, 202 and 203, each being rotated in clockwise direction as viewed in Fig. 7. The carding mechanism comprises further three carding rolls designated respectively 204, 205 and 206, whereas the uppermost right-hand roll 207 functions as a dressing roll. The carding rolls 204, 205 and 206, and likewise the dressing roll 207 are rotated in the same rotational direction as the aforesaid left-hand set of carding rolls 200—203, namely, in clockwise direction as viewed in Fig. 7.

The wiper for the dressing roll 207 is indicated at 208 which may be rotated in clockwise direction by any suitable gearing mechanism.

The stripping roll for the carding roll 200 is indicated at 210, which is rotated in counterclockwise rotation by gearing arrangement similarly as above; similarly, the stripping roll 211 of the carding roll 201, also the stripping roll 212 of the carding roll 202 and the stripping roll 213 of the carding roll 203. The stripping roll 214 of the carding roll 204 is similarly rotated in counterclockwise direction, similarly, the stripping roll 215 of the carding roll 205 and the stripping roll 216 of the carding roll 206, the same being driven by positively actuated gearing elements from the main drive shaft 3.

Such arrangement provides for seven streams of carded tobacco by the use of seven carding rolls and a single dressing roll, which arrangement attains an increased number of carded streams as compared with the arrangement shown in Fig. 1.

Preferably, the streams of carded tobacco are controlled in distribution at the discharge of the hopper similarly as hereinabove, namely by partitions 217, 218, 219, 220 for the four carding rolls of the left-hand set, the partition 221 for directing the stream carded by the mutual carding action of the lowermost carding rolls 203 and 204; and similarly, the partitions 222, 223 and 224 for the carding rolls 204, 205 and 206 of the right-hand set.

The streams of carded tobacco may be delivered into the restricted discharge 6 of the hopper 5, similarly as set forth in the hereinabove described arrangement, or may be delivered upon an apron 230, and then discharged into the chute 231 having the restricted slot 232 corresponding to the hereinabove described restricted discharge slot 7. By means of the plurality of carded streams of tobacco and means for controlling the rate of feed of the respective streams of carded tobacco upon the traveling apron 230, any irregularities in the individual streams of carded tobacco are overcome and the apron functions thereby to deliver to the cigarette paper a substantially constant amount of carded tobacco for any given average speed of the individual carding rolls.

The gearing arrangement for driving the left-hand and right-hand sets of carding rolls corresponds generally to that described hereinabove and may comprise as is specifically set in hereinabove an outer set of serially connected gearing elements and an inner set of serially connected gearing elements; an additional intermediate gear is provided for obtaining the common rotation of all the carding rolls as obtains in this construction whereas the arrangement in Figs. 1 and 3, the two sets of carding rolls rotated in opposite directions.

Thus, as indicated in Fig. 6, the hereinabove described gear 20 meshes with the main gear 240 of the outer train and in operative adjacency with the shaft of the carding roll 204. The intermediate gear 241 connects the gear 240 with the succeeding gear 242 of lesser gearing ratio; the main gear 244 of still lesser gearing ratio is connected with the main gear 242 by the intermediate gear 243 and the intermediate gear 245 connects the main gear 244 with the main gear 246 of lessor gearing ratio.

The additional intermediate gear is indicated at 247 and connects the main gear 240 with the main gear 248, which in turn is connected by the intermediate gear 249 with the main gear 250, in turn connected by the intermediate gear 251 with the main gear 252 and in turn connected by the intermediate gear 253 with the main gear 254. The main gear 248 of the outer train of gearing, is in operative adjacency with the shaft of the carding roll 203. The main gear 250, of lesser ratio than the main gear 248, is in operative adjacency with the shaft of the carding roll 202. The main gear 252 and the main gear 254 are of graduated lesser gearing ratios and are provided respectively for the carding rolls 201 and 200.

Within the hopper 5, I provide the mechanical distributor 260 rotating to feed tobacco toward the uppermost carding roll 200. In the embodiment shown in Fig. 7, the direction of rotation of the distributor 260 is in clockwise direction, to feed the tobacco toward the uppermost carding roll 200. The distributor 260 comprises a plurality of spaced vanes mounted on the shaft 261, journalled in the opposite walls of the hopper 5, and driven by the gear 262, about which passes the chain 263 meshing with the driving gear 264 secured to the gear 240, of the outer right-hand train of gears of the carding mechanism.

By reason of the common rotative direction of the tops of the carding rolls 200—207, the whole charge of tobacco is subjected to a continued rotative agitation, thereby precluding the formation of any "bridges". Such agitation tends to accumulate the tobacco in the region adjacent the carding roll 206 and a distributor 260 to "rake" the upper layers of such accumulation back and over the lowermost agitated layer in the opposite direction in return to the rolls 200, 201. Such "raking" action can be enhanced by an additional rake 260 arranged in series.

In Fig. 12, I have illustrated another form of carding mechanism comprising a series of mutually coacting carding rolls arranged to be inclined upwardly in one direction. In this arrangement, the lowermost carding roll 270 is positioned lowerly at one side, say to the left, of the hopper 271; its adjacent carding roll 272 is located to the right and the carding rolls 273, 274, and 275 extend upwardly toward the right-hand side of the hopper 271. At the side of the hopper 271 opposite to the uppermost roll 275, I provide a movable barrier such as an endless belt 276 located at its bottom above the carding roll 270 and suitably driven to actuate its inner lead upwardly, as is indicated by the arrow 277.

In such arrangement, the carding rolls 270 to 275 are rotated in clockwise direction respectively by suitable gearing, such as is set forth more particularly hereinabove in reference to other modifications of this invention. Specifically I have shown in Fig. 12, a train of positively geared gearing elements comprising the gear 278, suitably driven from the drive of the hopper, say from the shaft 17, see Fig. 2; the gear 278 meshes with the gear 279 serving as the gear of the carding roll 270 of its inwardly disposed set of the alternate sets of gear trains and adapted to be connected with the shaft of the carding roll 270 by means of a clutch arrangement, such as specifically described hereinabove. The gear 278 meshes also with the gear 280 of the inward set and disposed in relative adjacency to the shaft of the carding roll 272. The intermediate gear 281 connects the main gear 280 with the next main gear 282 for the carding roll 273; the intermediate gear 283 connects the main gear 282 with the next main gear 284 and the intermediate gear 285 connects the main gear 284 with the next main gear 286.

The movable wall 276 may be driven from the driving gear 278, by providing the gear 287 secured to the main gear 279 of the carding roll 270 and meshing with the gear 287, the gear 288 secured to the lower driving shaft of the belt 276. The upper shaft of the belt 276 is shown at 289.

It will be noted that the speed of rotation of the carding roll 272 is materially greater than the speed of rotation of its adjacent coacting carding roll 273, provided for by the increased diameters of the main gear 282, relative to the main gear 280; similarly, the speed of rotation of the carding roll 273 is greater as compared with the speed of rotation of its succeeding and mutually coacting carding roll 274 and similarly relative to the mutually coacting carding rolls 274 and 275. By such arrangement, a wedging action of the tobacco is effected between each pair of mutually coacting carding rolls, thereby insuring uniformity of depth of tobacco within the filleting of the carding rolls and uniformity of felting of carded tobacco by the carding rolls.

The belt 276 serves to prevent the "arching" of the tobacco above the carding rolls.

Any preferred form of brush 115 may be associated with the uppermost roll 275, as has been set forth hereinabove.

The modification shown in Fig. 13 corresponds generally to that shown in Fig. 12 in respect to the carding rolls and the train of driving gears, and like elements are designated by the same reference numbers. However, in Fig. 13 I have shown another form of movable wall in the form of the board 290, extending from one side of the hopper to the opposite side, and mounted oppositely at 291 at its bottom in close adjacency to the lowermost carding roll 270. Toward the upper end of the wall 290, I connect the link 292, the opposite end 293 of which is connected to the crank wheel 294 rotated from the drive of the hopper in any suitable manner.

Such form of agitator 290 may be employed in the arrangement shown in Fig. 3, located at the center of the hopper 5, in lieu of the agitator 131, serving as a dividing roll and enables two kinds or two conditions of tobacco, one on each side of the wall 290 to be fed into the hopper and the mixture or blending of the two tobaccos effected in the carded streams and resulting cigarettes.

Another preferred form of agitating the tobacco charge within the hopper 5 is by means of a large number of vertically extending fingers distributed within the hopper and extending into the mass of tobacco and tappers to vibrate the fingers at a relatively high frequency, whereby substantially the entire charge of tobacco in the hopper is vibrated at such high frequency, and causes the tobacco to settle, whereby the formation of "air pockets" within the tobacco charge is precluded and the tobacco is caused to be in continuous effective engagement with the filleting of the carding rolls.

In the arrangement in Fig. 3, and similarly in Figs. 6 and 7, the wedging action is more pronounced upon increasing the speed of the roll rotating inwardly of the wedge relative to the speed of the coacting roll; thus, in the arrangement shown in Fig. 3, upon rotating the carding roll 40, say twice the speed of its coacting roll 41, a wedge of the portion of the tobacco charged adjacent these rolls is formed. Such wedging action insures the filling and packing of the tobacco into the filleting of the carding roll rotating inwardly of such wedge, such as the carding roll 40 in Fig. 3, thereby maintaining uniform depths and weight of the tobacco at all times within the filleting and thus deriving improved carding action.

The carded tobacco is delivered from the hopper pursuant to the disclosure made hereinabove, is delivered to the cigarette paper and the cigarette rod is formed by the rod forming mechanism in the usual manner. The moving parts of the rod forming mechanism, including the feeding of the cigarette paper thereto, are driven by positively geared elements driven from the main shaft 3 or any positively driven shaft of the machine.

In Fig. 14, I have illustrated in a diagrammatic form the usual, large drive pulley 300 about which the tube belt 301 passes. The shaft 302 of the pulley is positively driven from the main shaft 3 of the cigarette machine at a predetermined speed. The belt 301 is usually regulated in tension by the spring-pressed idler 303, and is guided in its path adjacent the delivery opening 7 of the hopper 5 by the guide pulley 304, whereafter the belt passes horizontally to the former or forming shoe 305, whereby the belt 301, the cigarette paper 306 and the cigarette tobacco indicated at 307 is "rolled" in the formation of the resulting cigarette rod 308. The cigarette rod 308 may be severed into individual cigarettes in the usual manner. The delivery of the carded cigarette tobacco from the hopper 5 upon the length of cigarette paper 306 is indicated at 309.

Preferably, the delivery portion 6, as is indicated in Fig. 2, is subjected to agitation by any approved type of agitator, such as the arm 270a, or set of such arms coacting with the cushion 271a secured to one side of the discharge box 6, and operated in its striking throw by its retractile spring 272a which is compressed upon outward movement of the rod 270a by means of the lever 273a tripped by the cam 274a on the shaft 13.

Whereas I have described my invention by reference to specific forms thereof, it will be understood that many changes and modifications may be made without departing from my invention.

I claim:

1. In a cigarette making machine, including a hopper, carding mechanism therefor comprising a plurality of carding rolls, gearing throughout positively geared with one another for rotating said carding rolls, said gearing comprising a plurality of sets of serially connected gearing elements respectively for said carding rolls and means operable at the will of the operator for connecting any carding roll respectively with a gearing element of one set of said plurality of sets during the operation of said carding mechanism.

2. In a cigarette making machine including a hopper, carding mechanism therefor comprising a plurality of sets of mutually co-operating carding rolls, gearing throughout positively geared with one another for rotating said carding mechanism, said gearing comprising a plurality of sets of serially connected gearing elements of different gearing ratios and means for connecting any carding rolls respectively with either of its sets of gearing during the operation of said carding mechanism.

3. A variable speed drive for a carding mechanism of a cigarette machine, said carding mechanism comprising a plurality of carding rolls having individual shafts, a set of serially connected gears of predetermined varying gearing ratios arranged respectively in operative adjacency to said shafts of the carding rolls, a second set of serially connected gears of different predetermined varying gearing ratios arranged respectively in operative adjacency to said shafts of the carding rolls and clutch members for connecting the respective shafts of said carding rolls alternately with its gear of said first-named set or with its gear of said second-named set.

4. In a cigarette making machine, carding mechanism comprising a plurality of carding rolls arranged to produce a plurality of streams of carded tobacco, positively geared means for rotating said carding roll sand means variable at the will of the operator for varying the relative speeds of said carding rolls.

5. In a cigarette making machine, carding mechanism comprising a plurality of carding rolls arranged to produce a plurality of streams of carded tobacco, positively geared means for rotating said carding rolls and means variable at the will of the operator for varying the relative speeds of said carding rolls, said variable means being arranged relative to said positively geared means to be operative during the continued rotation of said carding rolls.

6. In a cigarette making machine, carding mechanism comprising a series of respectively mutually coacting rolls, and positively geared means for varying the relative speeds of rotation of said rolls operative during the continued operation of the cigarette making machine.

WILLIAM F. GRUPE.